(12) United States Patent
Kitagawa

(10) Patent No.: US 6,843,524 B2
(45) Date of Patent: Jan. 18, 2005

(54) FRONT BODY STRUCTURE FOR VEHICLE

(75) Inventor: Yuichi Kitagawa, Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/274,918

(22) Filed: Oct. 22, 2002

(65) Prior Publication Data

US 2003/0080587 A1 May 1, 2003

(30) Foreign Application Priority Data

Oct. 29, 2001 (JP) .................................... P2001-330734

(51) Int. Cl.⁷ ................................................ B60J 7/00
(52) U.S. Cl. .................. 296/187.09; 296/189; 296/194; 280/781; 180/312
(58) Field of Search ....................... 296/187.09, 203.02, 296/204, 189, 188, 194, 209; 280/781, 124.1, 785, 788, 784, 124.109; 180/312, 311, 291

(56) References Cited

U.S. PATENT DOCUMENTS

| | | | | |
|---|---|---|---|---|
| 3,252,211 A | * | 5/1966 | Lindstrom | 280/790 |
| 3,520,552 A | * | 7/1970 | Graham et al. | 280/784 |
| 4,046,415 A | * | 9/1977 | Klees et al. | 280/781 |
| 4,263,980 A | * | 4/1981 | Harlow et al. | 180/312 |
| 4,753,315 A | * | 6/1988 | Fujisaki et al. | 296/194 |
| 4,781,398 A | * | 11/1988 | Uebelstadt et al. | 280/784 |
| 4,826,203 A | * | 5/1989 | Kijima et al. | 280/124.109 |
| 5,074,374 A | * | 12/1991 | Ohtake et al. | 180/312 |
| 5,280,957 A | * | 1/1994 | Hentschel et al. | 280/124.109 |
| 5,372,216 A | * | 12/1994 | Tsuji et al. | 296/189 |
| 5,547,224 A | * | 8/1996 | Kami et al. | 280/781 |
| 5,560,651 A | * | 10/1996 | Kami et al. | 280/124.109 |
| 5,562,308 A | * | 10/1996 | Kamei et al. | 180/377 |
| 5,609,366 A | * | 3/1997 | Kamei et al. | 280/788 |
| 5,611,569 A | * | 3/1997 | Sekiguchi et al. | 280/788 |
| 5,641,180 A | * | 6/1997 | Kamei et al. | 280/781 |

(List continued on next page.)

FOREIGN PATENT DOCUMENTS

| | | |
|---|---|---|
| DE | 199 59 607 | 6/2001 |
| JP | 46-34325 | 10/1971 |
| JP | 1-116777 | 8/1989 |
| JP | 2-98074 | 8/1990 |
| JP | 3-78774 | 7/1991 |
| JP | 3-91282 | 9/1991 |
| JP | 8-156827 | 9/1996 |

(List continued on next page.)

Primary Examiner—Kiran Patel
(74) Attorney, Agent, or Firm—McDermott Will & Emery LLP

(57) ABSTRACT

A front body structure is provided to disperse an impact load to a floor framework member through a rear end of a subframe effectively. The subframe 11 includes a left side frame 12L, a right side frame 12R and a rear frame 13. Each of the side frames 12L, 12R includes a forked part 14 having an inside branch part 14a pointing to a vehicle's inside in a width direction of the vehicle along a first route A and an outside branch part 14b pointing to a vehicle's outside in the width direction along a second route B. In operation, if an impact load F due to an offset front collision is applied on the side frame 12 in concentration, then the load F is divided into a load component Fa to be transmitted to the other side frame 12L through the inside branch part 14a and the rear frame 13 along the first route A and another load component Fb to be transmitted to the floor framework member 8 through the outside branch part 14b along the second route B.

17 Claims, 12 Drawing Sheets

U.S. PATENT DOCUMENTS

| | | | |
|---|---|---|---|
| 5,810,426 A * | 9/1998 | Bovellan | 296/194 |
| 5,862,877 A * | 1/1999 | Horton et al. | 180/312 |
| 6,003,897 A * | 12/1999 | Dostert et al. | 280/781 |
| 6,170,875 B1 * | 1/2001 | Jones et al. | 280/788 |
| 6,220,655 B1 * | 4/2001 | Gure et al. | 296/194 |
| 6,269,902 B1 * | 8/2001 | Miyagawa | 180/312 |
| 6,428,046 B1 * | 8/2002 | Kocer et al. | 280/781 |
| 6,511,096 B1 * | 1/2003 | Kunert et al. | 280/124.109 |

FOREIGN PATENT DOCUMENTS

| | | | |
|---|---|---|---|
| JP | 9-119322 | | 5/1997 |
| JP | 09-240291 | | 9/1997 |
| JP | 11 5559 | * | 1/1999 |
| JP | 11-222152 | | 8/1999 |
| JP | 2000/016327 | | 1/2000 |
| JP | 2000 344131 | * | 12/2000 |
| JP | 2001 310755 | * | 11/2001 |
| JP | 2001/310755 | | 11/2001 |
| JP | 2002/053076 | | 2/2002 |

* cited by examiner

FRONT BODY STRUCTURE FOR VEHICLE

BACKGROUND OF THE INVENTION

1. Field of the Invention

The present invention relates to a front body structure for a vehicle.

2. Description of Related Art

In general, the front body structure for a vehicle is designed so as to absorb a collision energy when at least one side member forming a fore-and-aft directional framework member of a front compartment collapses in the axial direction of the side member.

However, for reasons that the side member is not always formed straightly and a power unit (e.g. heavy engine, drive motor) is attached to the side members, there is a possibility that the side members are deformed in bending at the vehicle collision.

Additionally, when the vehicle has an offset front collision, a problem arises in the impossibility of absorbing a collision energy sufficiently since a collision input (load) concentrates on one side member. In order to solve the above problem, Japanese Patent Application Laid-open No. 9-119322 discloses a structure that is directed to increase the absorption of collision energy at the vehicle front collision. In the structure, there is provided a large-sized subframe by which vehicle unit components (e.g. power unit, suspension parts, etc.) are suspended. In assembling, the subframe is attached to the side members from the underside of the vehicle. With the above arrangement, when the vehicle has a front collision, not only the side members but also the subframe is simultaneously deformed to increase the absorption of collision energy.

Note, the subframe forming the above structure includes a left side frame and a right side frame, which will be often referred "left-and-right side frames" hereinafter, a front cross member connecting the front sides of the side members with each other and a rear cross member connecting the rear ends of the side members with each other. With these constituents, the subframe is shaped to be rectangular in plan view, with a width substantially equal to a distance between the left side member and the right side member (referred "left-and-right side members" hereinafter). Further, the subframe is provided, at four corners thereof, with mount parts through which the subframe is secured to the underfaces of the left-and-right side members.

SUMMARY OF THE INVENTION

In the above-mentioned structure, the above (front-and-rear side) mount parts of the subframe are positioned on extensions of the side frames each shaped straightly in plan view. Therefore, when a collision input (load) due to the vehicle front collision acts on the front end of the side frame in the axial direction, there is a tendency for an impact load to act on each joint of the rear-side mount parts to the axial direction of the side frames. Consequently, there is a possibility that the joints of the rear-side mount parts moves backward to cause the vehicle cabin to be deformed.

In order to prevent the vehicle cabin from being deformed, it is supposed to reinforce the environs of the joints of the rear-side mount parts and also enhance rigidity of the front part of the vehicle cabin. However, this measures cause a weight of the structure to be increased with the disadvantage in manufacturing cost.

Under the above circumstance, it is an object of the present invention to provide a front body structure which can disperse and transmit a collision input (load) due to the vehicle front collision to a floor framework member forming a cabin floor of the vehicle effectively.

According to the present invention, the above-mentioned object is accomplished by a front body structure for a vehicle, comprising:

a front-compartment framework member forming a front compartment of the vehicle;

a floor framework member forming a cabin floor of the vehicle;

a subframe arranged on the underside of a front compartment of the vehicle so as to span both of the front-compartment framework member and the floor framework member, the subframe being joined to both of the front-compartment framework member and the floor framework member and also having a pair of left-and-right side frames both extending in a fore-and-aft direction of the vehicle and a rear frame arranged on the rear side of the subframe to connect the left-and-right side frames with each other in a width direction of the vehicle;

a vehicle unit component supported by the subframe;

a first route established on the rear side of the subframe to direct a collision load, which has been applied on one of the left-and-right side frames in an axial direction, toward an inside of the one side frame in a width direction of the vehicle to transmit the collision load to the other side frame through the rear frame; and a second route established on the rear side of the subframe to direct the collision load toward an outside of the one side frame in the width direction of the vehicle to transmit the collision load to the floor framework member.

DESCRIPTION OF THE PREFERRED EMBODIMENT

Referring to accompanying drawings, various embodiments of the present invention will be described below.

Figure 1:
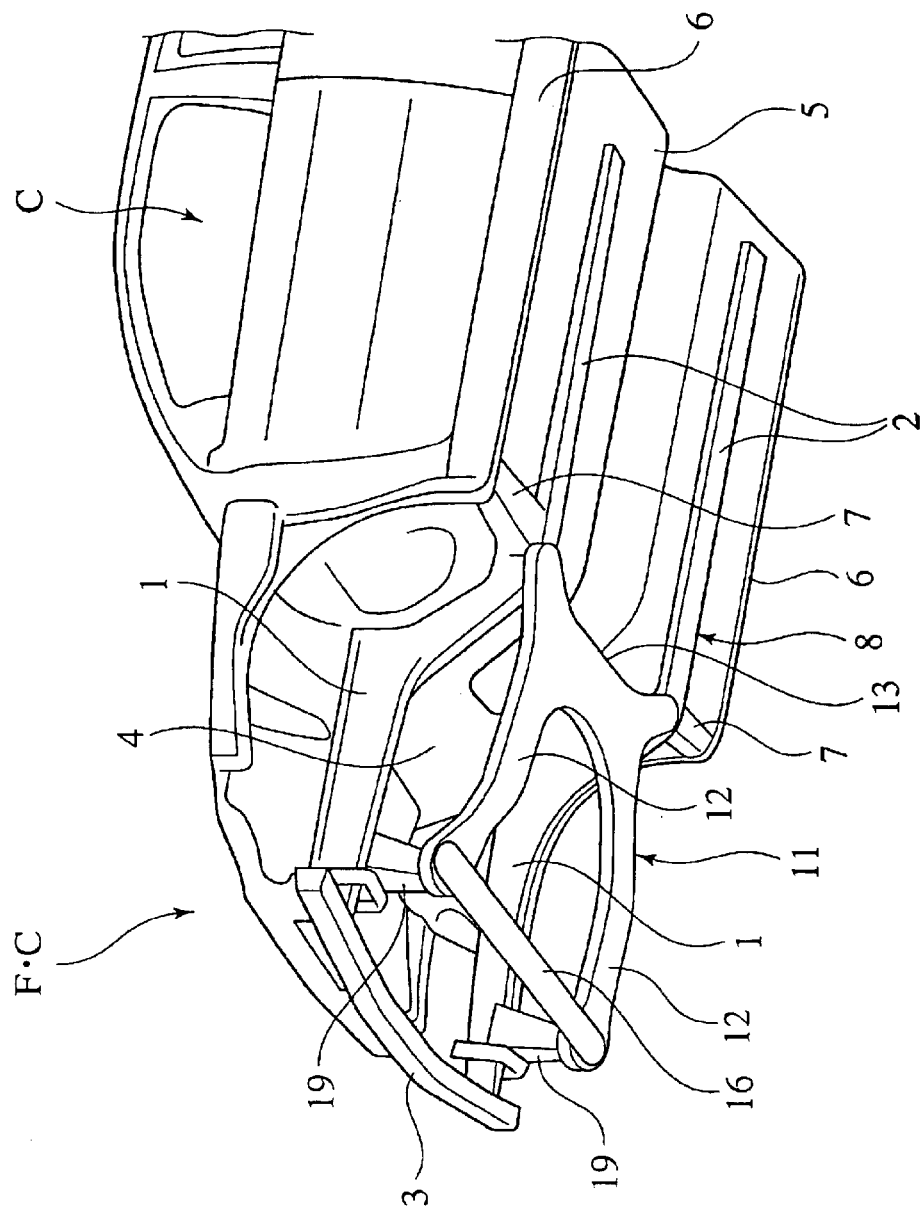
FIG. 1 is a perspective view of the underside of a vehicle adopting a front body structure of the invention.

In FIG. 1, a front compartment FC is provided, on both (left-and-right) sides thereof, with side members 1 that correspond to a front-compartment framework member in the fore-and-aft direction of the vehicle.

As to the side members 1 in pairs, their front ends are together connected to a bumper reinforcement 3 extending in the width direction of the vehicle. On the other hand, the rear portions of the side members 1 extend from a dash panel 4 separating the front compartment FC and a cabin C to an underface of a floor 5 thereby to provide extension side members 2 extending in the fore-and-aft direction of the vehicle.

On both (left-and-right) sides of the floor 5, there are arranged side sills 6 which form the framework in the fore-and-aft direction of the vehicle. The front end of each side sill 6 is joined to the front end of each extension side member 2 through an outrigger 7.

In this embodiment, a floor framework member (assembly) 8 of the cabin C includes the extension side members 2, the side sills 6 and also the outriggers 7.

At the lowermost position of the front compartment FC, there is arranged a subframe 11 for mounting so-called "vehicle unit components" thereon. Note, the above vehicle unit components include a power unit 10 (e.g. engine, drive motor), not-shown suspension parts and so on.

Figure 2:
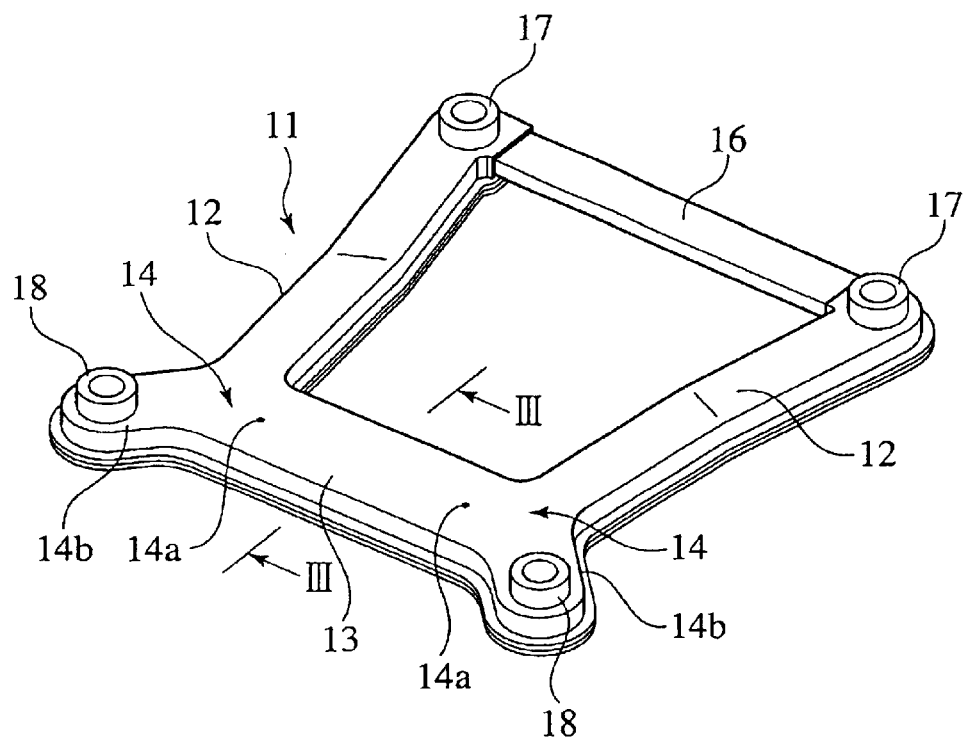
FIG. 2 is a perspective view of a subframe in accordance with the first embodiment of the invention.
Figure 4:
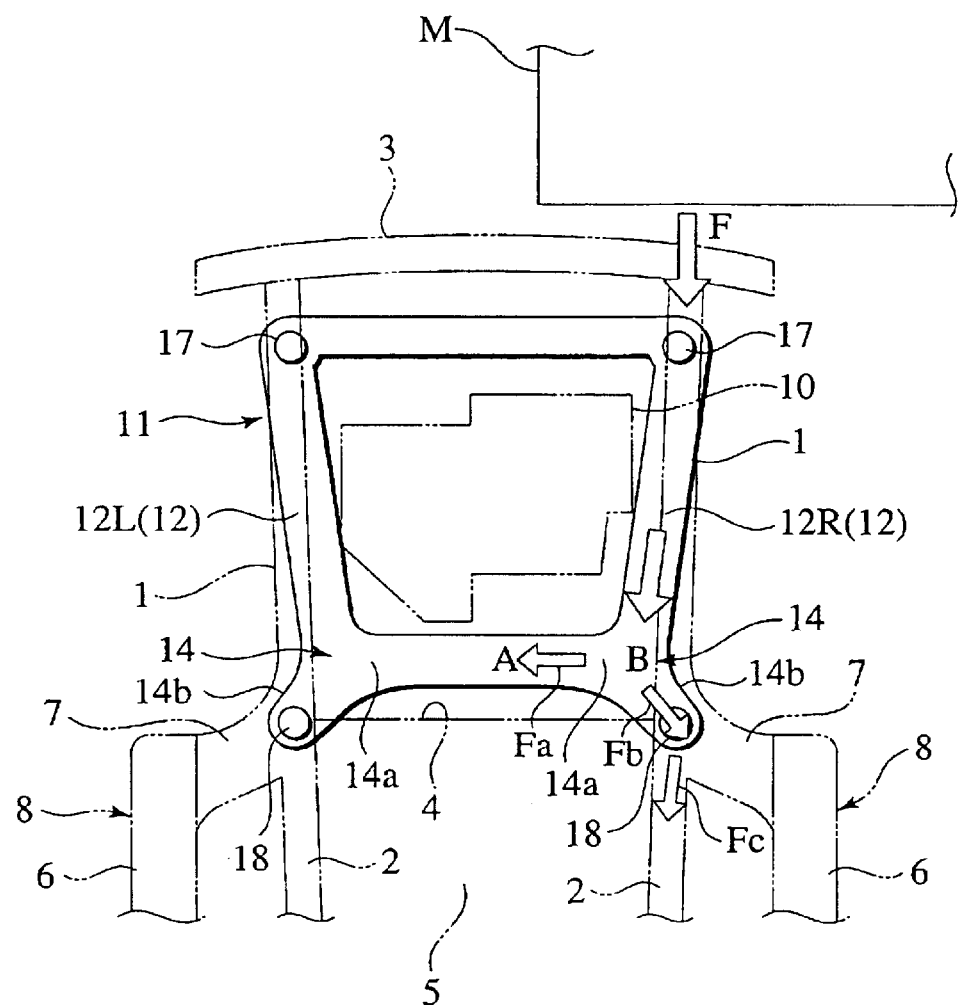
FIG. 4 is an explanatory plan view showing the first embodiment of the invention transparently.

As shown in FIGS. 2 and 4, the subframe 11 includes left and right side frames 12 extending in the fore-and-aft direction of the vehicle, a rear frame 13 arranged at the rear side of the subframe 11 to extend in the width direction of the vehicle and forked parts 14 formed on the rear ends of the side frames 12.

Each forked part 14 includes an inside branch part 14a extending from the rear end of the side frame 12 toward the rear frame 13 and an outside branch part 14b projecting from the side frame 13 outward in the width direction of the vehicle.

According to the embodiment, the outside branch part 14b is formed so as to project obliquely to behind of the inside branch part 14a, in plan view.

Further, according to the embodiment, the left-and-right side frames 12 and the rear frame 13 are formed into one body. Thus, the inside branch part 14a of one forked part 14 constitutes a joint part of the rear frame 13 with the side frame 12 and also the surroundings.

Figure 3:
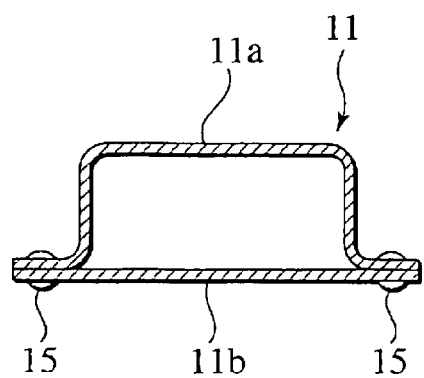
FIG. 3 is a sectional view taken along a line III—III of FIG. 2.

Each of the side frames 12 and also the rear frame 13 is formed with a closed section that can be obtained by first overlaying an upper panel 11a shaped to be a reversed hat on a lower panel 11b in the form of a flat plate and secondly welding or riveting these panels together. In an example shown in FIG. 3, the upper panel 11a is secured with the lower panel 11b by rivets 15 at overlapping portions of the panels.

The subframe 11 of the embodiment further includes a front frame 16 for connecting respective front ends of the side frames 12 with each other in the width direction of the vehicle.

Each side frame 12 is provided, on its front end, with a front-side mount part 17. While, in each forked part 14, the outside branch part 14b is provided, on its projecting end, with a rear-side mount part 18.

The side frames 12, the rear frame 13 and the front frame 16 are all shaped so as to be substantially straight in plan view.

The subframe 11 having the frames 12, 13, 16 and the forked parts 14 is joined to the underfaces of seating parts 19, which project from the front ends of the side members 1 downward, through the front-side mount parts 17 by means of fastening members, such as bolts and nuts. On the other hand, the same subframe 11 is also joined to the underface of the floor framework member 8 through the rear-side mount parts 18 in the same way. Thus, the subframe 11 is arranged so as to span both of the side members 1 and the floor framework member 8.

Consequently, there are established, on each side of the side frames 12, two load-transmitting routes consisting of: a first route A where a collision load F acting in the axial direction through e.g. the front end of the right side frame 12R is transmitted from the inside branch part 14a to the other left side frame 12L through the rear frame 13; and a second route B where the same collision load F is transmitted to the floor framework member 8 through the outside branch part 14b (see FIG. 4).

In this embodiment, as shown in FIG. 4, the rear-side mount parts 18 are joined to the vicinities of the front ends of the extension side members 2.

The above-mentioned power unit 10 is mounted so as to span both of the left side frame 12 and the right side frame 12.

According to the first embodiment mentioned above, as shown in FIG. 4, when the vehicle has an offset collision with an obstacle M through a vehicle's front-and-right side, the collision load F acts on the front end of the right side frame 12R of the subframe 11 in the axial direction.

The collision load (input) F is dispersed, at the forked part 14 at the rear end of the right side frame 12R, into a load component Fa and a load component Fb. The load component Fa is transmitted to the left side frame 12L through the inside branch part 14a and the rear frame 13 along the first route A directing to the inside of the side frame 12R in the width direction of the vehicle. On the other hand, the load component Fb is transmitted to the floor framework member 8 through the outside branch part 14b along the second route B directing to the outside of the side frame 12R in the width direction of the vehicle.

At the joint part of the rear-side mount part 18 in the second route B, there is remained a load component Fe in the fore-and-aft direction of the vehicle as long as the subframe 11 has rigidity in the fore-and-aft direction. However, owing to the production of the load components Fa, Fb in the width direction of the vehicle, it is possible to make the load component Fe smaller than the above collision load F.

As a result of that, the reversing load on the subframe 11 does not press the front part of the floor 5 of the cabin C immediately but is converted into a load spreading in the width direction of the vehicle and subsequently absorbed in the floor framework member 8 of the cabin C effectively, preventing the cabin C from being deformed.

Figure 5A:
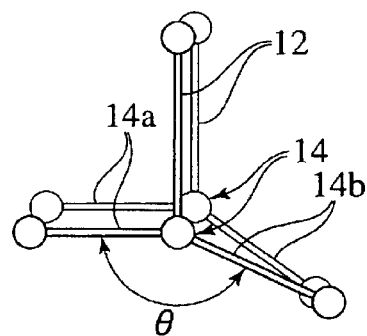
FIGS. 5A and 5B are imaginary views for explanation of patterns A and B about the deformation behavior of a forked part of the subframe of the first embodiment of the invention.
Figure 5B:
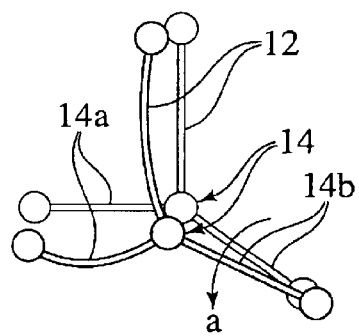

Hereat, it should be noted that there are supposed two patterns of FIGS. 5A and 5B with respect to converting action of load.

FIG. 5A shows a pattern that the forked part 14 is deformed. According to this pattern, by the fore-and-aft directional load transmitted from the right side frame 12R, the subframe 11 is deformed so that the an angle θ between the inside branch part 14a and the outside branch part 14b increases, whereby the rear frame 13 is compressed toward the forked part 14 of the left side frame 12L, while the outside branch part 14b acts as if it pushed out the rear-side mount part 18 backward and outside in the width direction of the vehicle.

FIG. 5B shows another pattern where the right side frame 12R, the inside branch part 14a and the rear frame 13 succeeding thereto are all deformed. By the collision load inputted to the front end of the right side frame 12R, all of the same frame 12R, the inside branch part 14a and the rear frame 13 are deformed. Since the outside branch part 14b is shorter than the right side frame 12R and the rear frame 13, the above-mentioned collision load provides the branch part 14b with no or less deformation, so that the forked part 14 rotates in the counter-clockwise direction shown with arrow a of FIG. 5B. Consequently, the rear frame 13 is compressed in the direction of the forked part 14 of the right side frame 12L on the opposite side. As the reaction, the outside branch part 14b pushes out the rear side mount part 18 backward and outside in the width direction of the vehicle.

In this way, the so-converted load acting as if the forked part 14 of the right side frame 12R pushed out the rear-side mount part 18 backward and outside in the width direction of the vehicle is received by the extension side member 2 of the highest rigidity and a gathering part of the outrigger 7 and the side sill 6 and further absorbed into these framework members (2, 6, 7) in dispersion.

On the other hand, owing to the substantially-linear configuration in plan view, the rear frame 13 can transmit the load component Fa dispersed while directing from the forked part 14 of the side frame 12R (collision side) inward of the width direction of the vehicle, to the forked part 14 of the opposite side frame 12L effectively.

Again, as the rear-side mount parts 18 of the forked parts 14 are joined to the vicinities of the front ends of the extension side members 2, the load transmitted from the rear-side mount part 18 can be born by the extension side members 2 and the surrounding floor panel, accomplishing the dispersion and transmission of load effectively. Moreover, it is possible to reduce the length of each rear-side mount part 18 projecting from the side frame 12, allowing both size and weight of the subframe 11 to be reduced.

Additionally, since the subframe 11 of the embodiment is equipped with the front frame 16 connecting the front ends of the side frames 12, 12 with each other in the width direction of the vehicle, the rigidity of the subframe 11 is so increased as to enhance its stability in supporting the vehicle unit components, such as the power unit 10. Further, since the frame constituents including the side frame 12 are all shaped to be substantially linear, it is possible to form the subframe 11 with ease.

Figure 6:
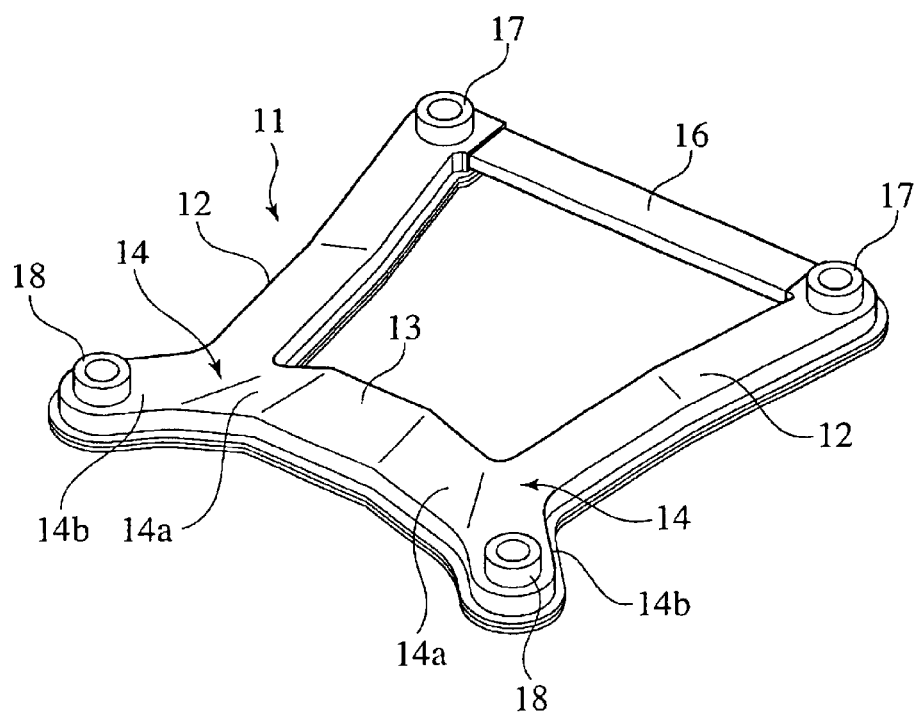
FIG. 6 is a perspective view of the subframe in accordance with the second embodiment of the invention.

FIG. 6 shows the second embodiment of the invention. Note, throughout the later-mentioned embodiments including this embodiment, elements similar to those of the first embodiment are indicated with the same reference numerals respectively and their overlapping descriptions are eliminated.

According to the second embodiment of the invention, the rear frame 13 of the subframe 11 is curved upward.

In addition to the effects of the first embodiment, while transmitting the load component Fa, which has been dispersed at the forked part 14 of the side frame 12R to direct the first route A, to the other side frame 12L through the rear frame 13, the load component Fa causes the rear frame 13 to be plastically formed in the curved direction, allowing the collision energy to be absorbed partially.

Additionally, since the rear frame 13 is curved upward, it is possible to avoid the interference of the subframe 11 with other components (for example, exhaust pipes, a drive shaft, etc.) extending from the inside of the front compartment FC to the underside of the floor 5.

Figure 7:
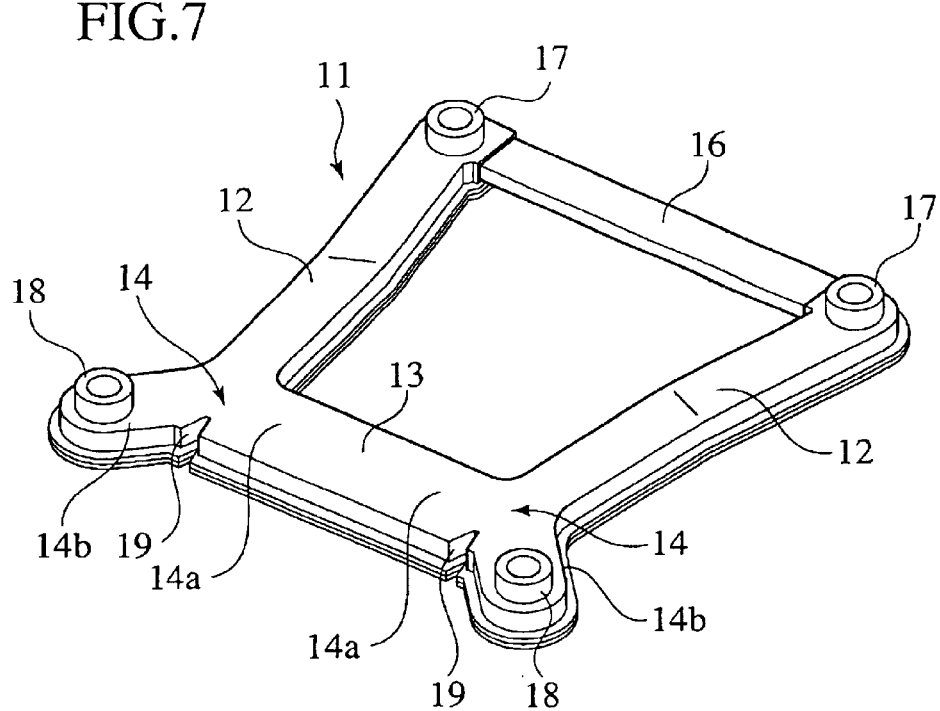
FIG. 7 is a perspective view of the subframe in accordance with the third embodiment of the invention.

FIG. 7 shows the third embodiment of the invention. In this embodiment, the subframe 11 is provided, behind the forked parts 14, with notches 19 each serving as a weakened part between the inside branch part 14a and the outside branch part 14b.

According to the embodiment, owing to the provision of the notches 19 each positioned at a boundary part between the inside branch part 14a and the outside branch part 14b, the collision load transmitted from the front side of one side frame 12 in the axial direction causes the forked part 14 to be deformed as if the above boundary part were torn with the notch 19 as the starting point of tear, whereby the conversion of load in the width direction of the vehicle to the first route A and the second route B can be promoted.

Figure 8:
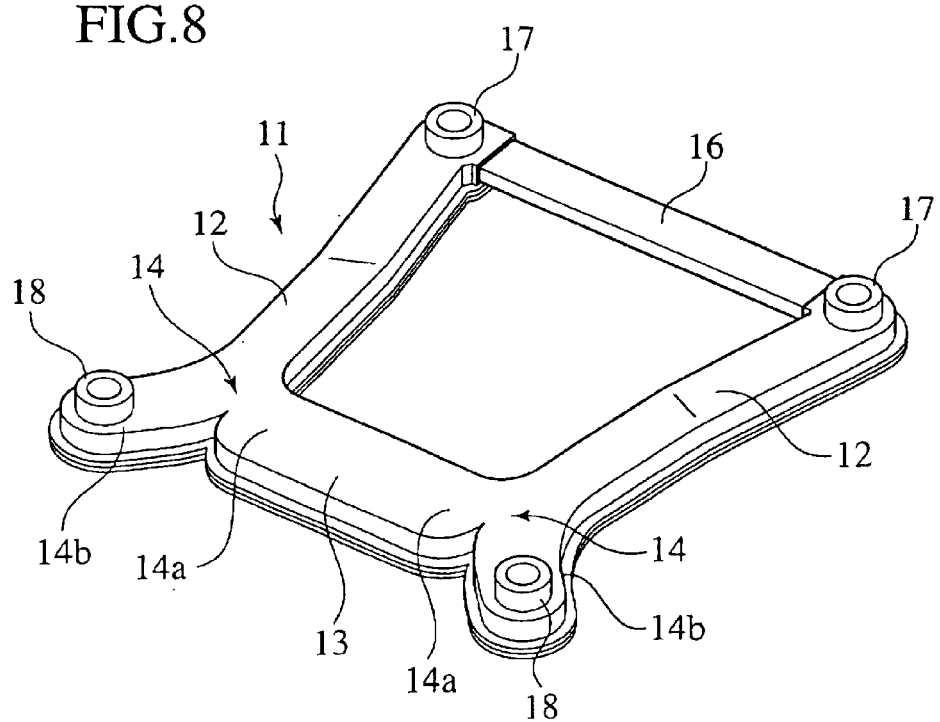
FIG. 8 is a perspective view of the subframe in accordance with the fourth embodiment of the invention.

FIG. 8 shows the fourth embodiment of the invention. In this embodiment, each of the forked parts 14 of the subframe 11 is shaped so that the inside branch part 14a and the outside branch part 14b diverge from each other in a substantial Y-shaped pattern in plan view.

In addition to the effects by the first embodiment, owing to the Y-shaped divergence of the inside branch part 14a and the outside branch part 14b, it is possible to disperse the collision load into the first route A and the second route B generally equally, enhancing the load-transmitting efficiency of the front body structure.

Additionally, as similar to the third embodiment of the invention, since the axial load on one side frame 12 causes the forked part 14 to be deformed as if a boundary part between the inside branch part 14a and the outside branch part 14b were torn with its cut-out part as the starting point of tear, it is possible to promote the conversion of load in the width direction of the vehicle to the first route A and the second route B.

Figure 9:
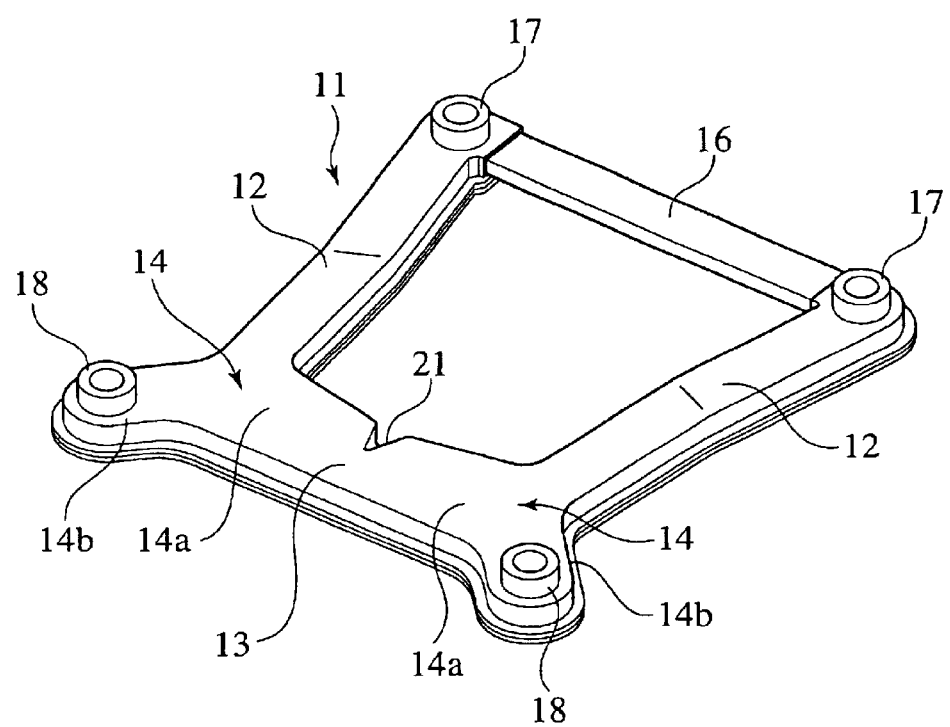
FIG. 9 is a perspective view of the subframe in accordance with the fifth embodiment of the invention.

FIG. 9 shows the fifth embodiment of the invention. In the subframe 11 of this embodiment, the rear frame 13 is provided, at its front edge of the center part in the width direction of the vehicle, with a notch 21 as a weakened part, which stimulates the center part to a rearward buckling due to the collision load.

In addition to the effects by the first embodiment, while transmitting the load component Fa, which has been dispersed at the forked part 14 of the side frame 12R to direct the first route A, to the other side frame 12L through the rear frame 13, this load component Fa allows the rear frame 13 to be buckled backward with the notch 21 as the starting point of buckling, allowing the collision energy to be absorbed partially.

During this buckling, since the rear frame 13 is deformed so that the front edge having the notch 21 is compressed while the rear edge is expanded, the rear-side mount parts 18 are urged outward in the width direction of the vehicle. Accordingly, it is possible to make use of the reactive force of the floor framework member 8, in the above buckling deformation effectively.

Figure 10:
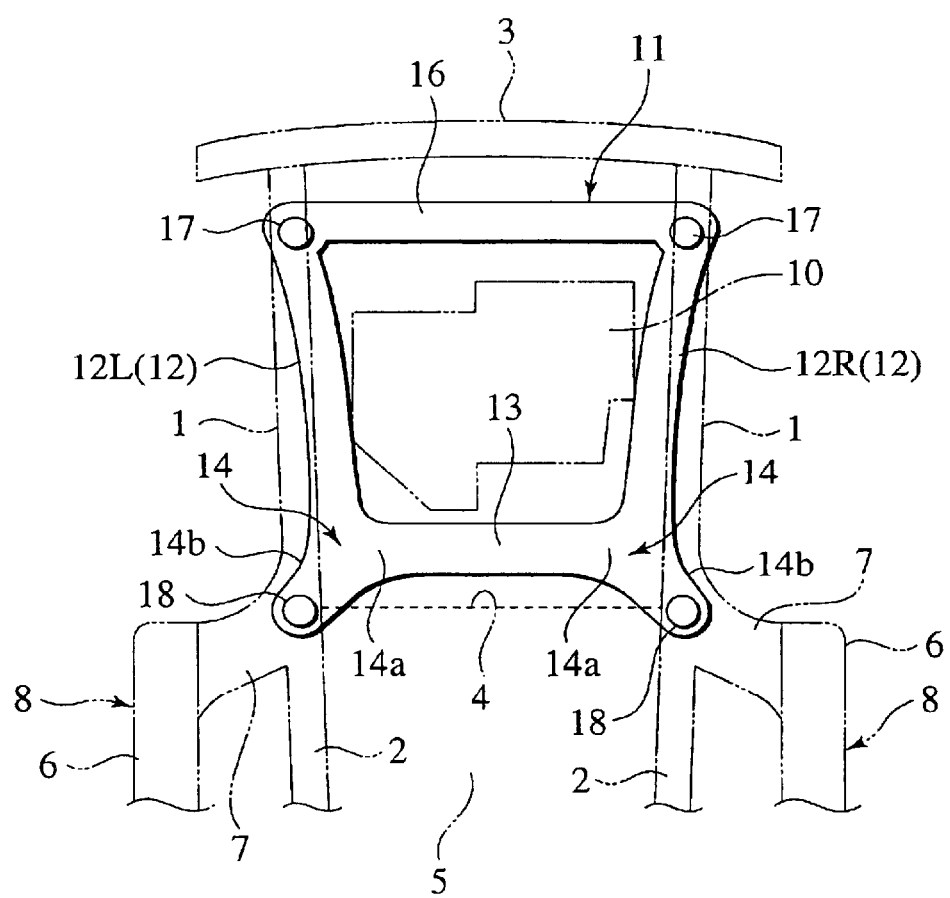
FIG. 10 is an explanatory plan view showing the sixth embodiment of the invention transparently.

FIG. 10 shows the sixth embodiment of the invention. According to the embodiment, the side frames 12 of the subframe 11 of the first embodiment are curved toward the inside of the vehicle in the width direction.

In addition to the effects by the first embodiment, while transmitting the collision load, which has been inputted on the front side of the side frames 12, to the forked parts 14, this collision load allows the so-curved side frames 12 to be bent inward in the width direction of the vehicle, allowing the collision energy to be absorbed partially.

With the progress of bending, since the side frames 12 interfere with the power unit 10, the resulting resistance of the unit 10 allows the absorbing effect for collision energy to be enhanced.

Figure 11:
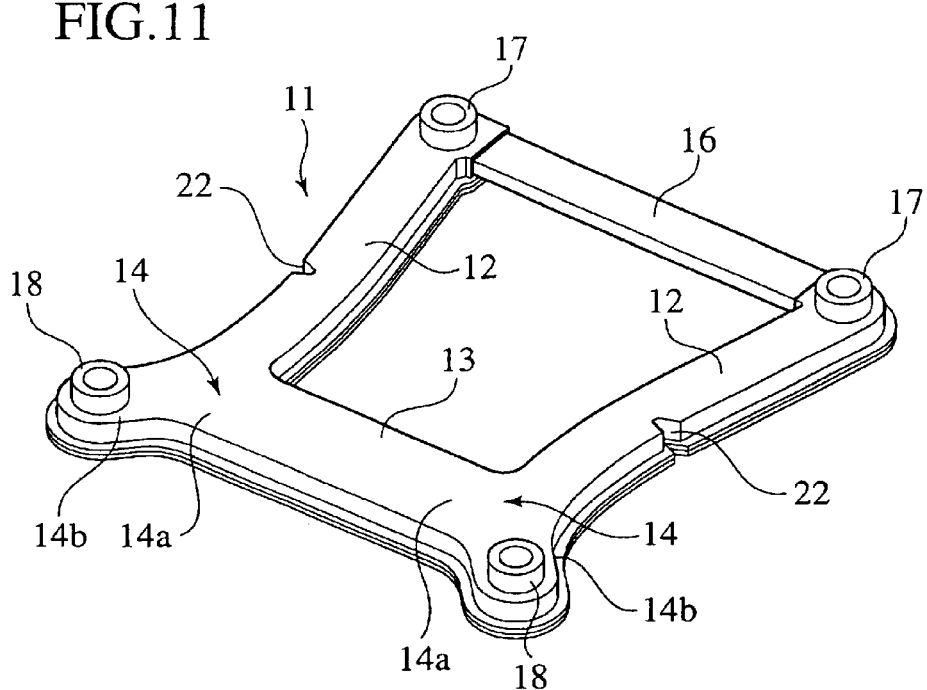
FIG. 11 is a perspective view of the subframe in accordance with the seventh embodiment of the invention.

FIG. 11 shows the seventh embodiment of the invention. According to the embodiment, each of the inward-curved side frames 12 of the sixth embodiment is provided with a notch 22 as a weakened part, which stimulates the side frame 12 to an inward buckling due to the collision load.

The notch 22 is positioned on an outer edges of the side frame 12 in the width direction of the vehicle, preferably, the outer edge of the maximum curved portion of the side frame 12.

According to the seventh embodiment of the invention, in addition to the effects by the sixth embodiment, it is possible to promote the inward buckling of the side frames 12 with the notches 22 as the starting points of deformation caused by the collision load. Further, by specifying the interference point of the side frames 12 with the power unit 10 due to the buckling deformation, it is possible to enhance the absorbing effect of collision energy furthermore.

Figure 12:
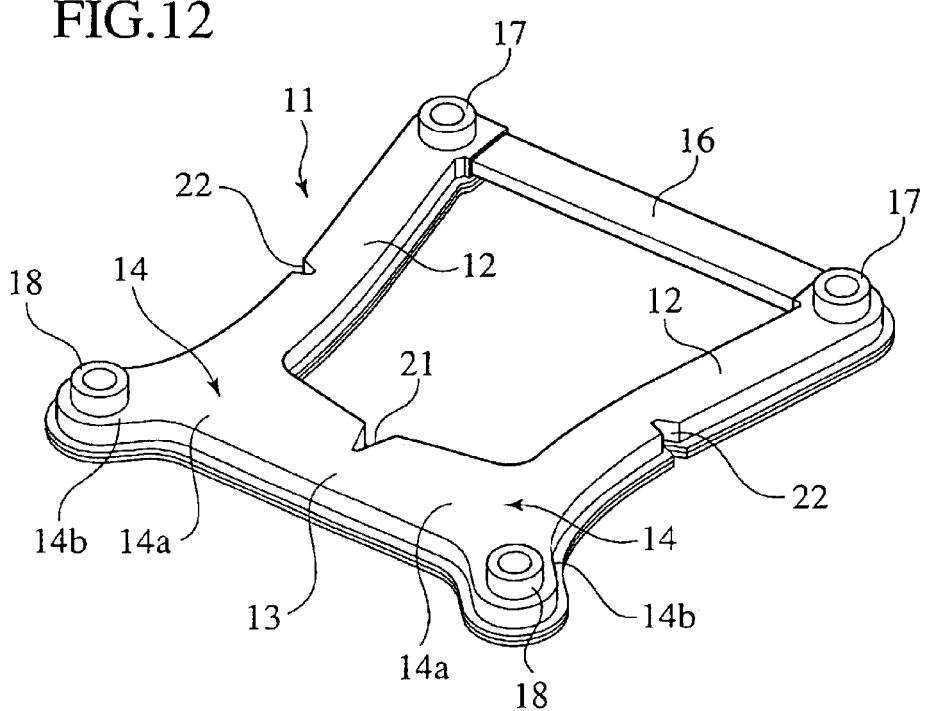
FIG. 12 is a perspective view of the subframe in accordance with the eighth embodiment of the invention.
Figure 13:
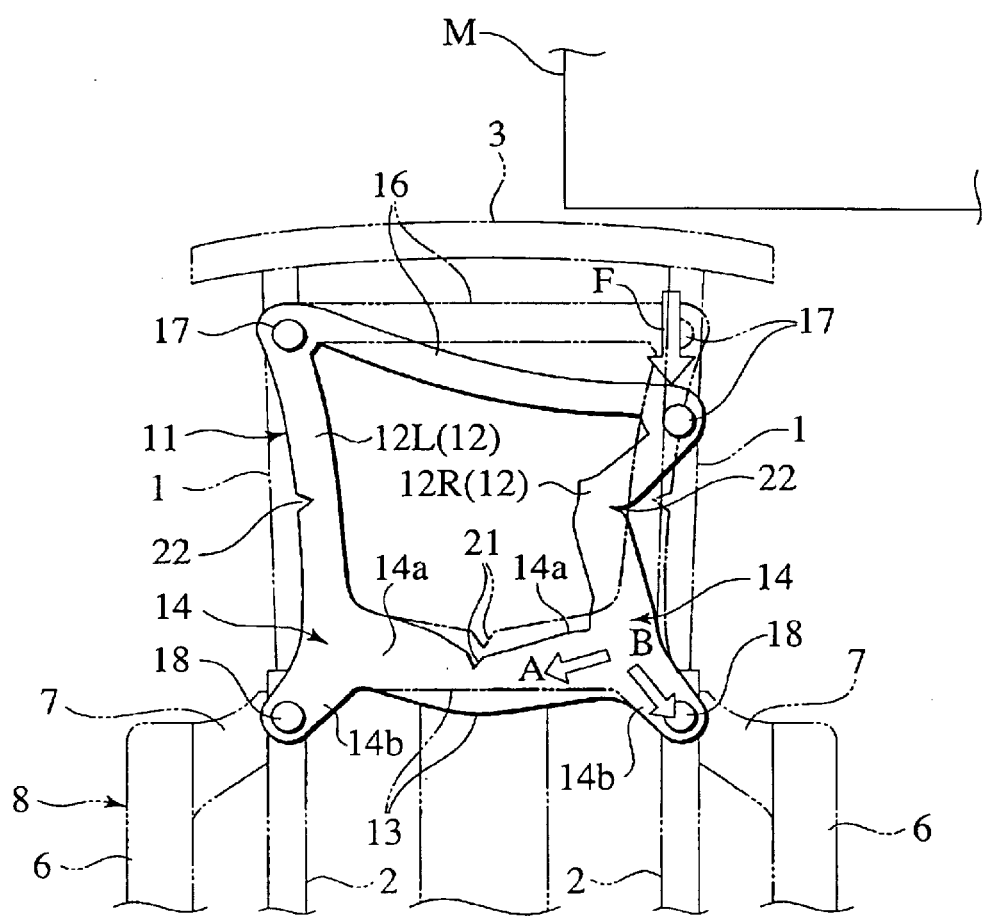
FIG. 13 is an explanatory plan view showing the deformation behavior of the eighth embodiment of the invention transparently.

FIGS. 12 and 13 show the eighth embodiment of the invention. In the embodiment, the subframe 11 corresponding to the seventh embodiment is provided, at a front edge of the rear frame 13, with the notch 21 as the weakened part, similar to that of the fifth embodiment.

FIG. 13 shows the deforming behavior of the subframe 11 when the vehicle has an offset collision with an object M.

If the collision input F concentrates and acts on the front side of the side frame 12R in the axial direction, then the side frame 12R is buckled inward in the width direction of the vehicle, with the notch 22 as the starting point of deformation while transmitting its collision load to the forked part 14, providing the similar effects to the seventh embodiment. In addition, due to the load component Fa resulting from the dispersion for the first route A at the forked part 14, the rear frame 13 is also buckled rearward with the notch 21 as the starting point of deformation. In this way, it is possible to enhance the absorbing effect of collision energy furthermore.

Figure 14:
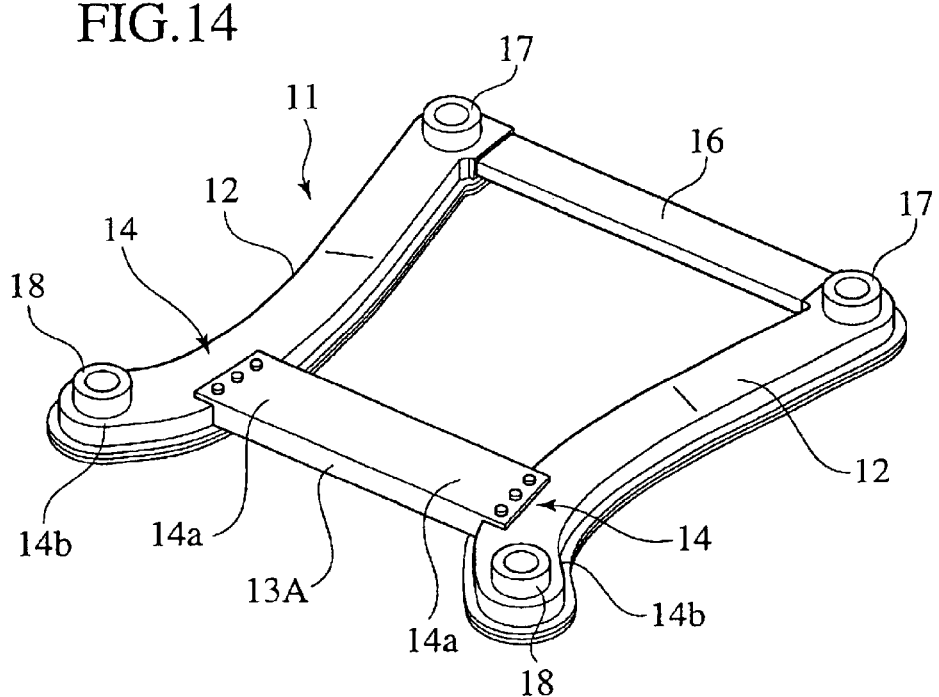
FIG. 14 is a perspective view of the subframe in accordance with the ninth embodiment of the invention.

FIG. 14 shows the ninth embodiment of the present invention. According to the embodiment, the rear ends of the side frames 12 of the subframe 11 of the first embodiment are extended and curved outward in the width direction of the vehicle. Further, a rear frame 13A is connected to both of base parts of the so-curved extensions of the side frames 12. In this embodiment, each rear extension of the side frame 12 constitutes the outside branch part 14b, while the base part of the rear frame 13A joined to each side frame 12 constitutes the inside branch part 14a, both providing the forked part 14.

In addition to the effects by the first embodiment, since the side frame 12 and the rear frame 13A are formed by different bodies, it is possible to apply the subframe 11 of the embodiment to a variety of the vehicles having different vehicle widths by adjusting respective length of the rear frame 13A and the front frame 16 while maintaining the side frames 12.

Figure 15:
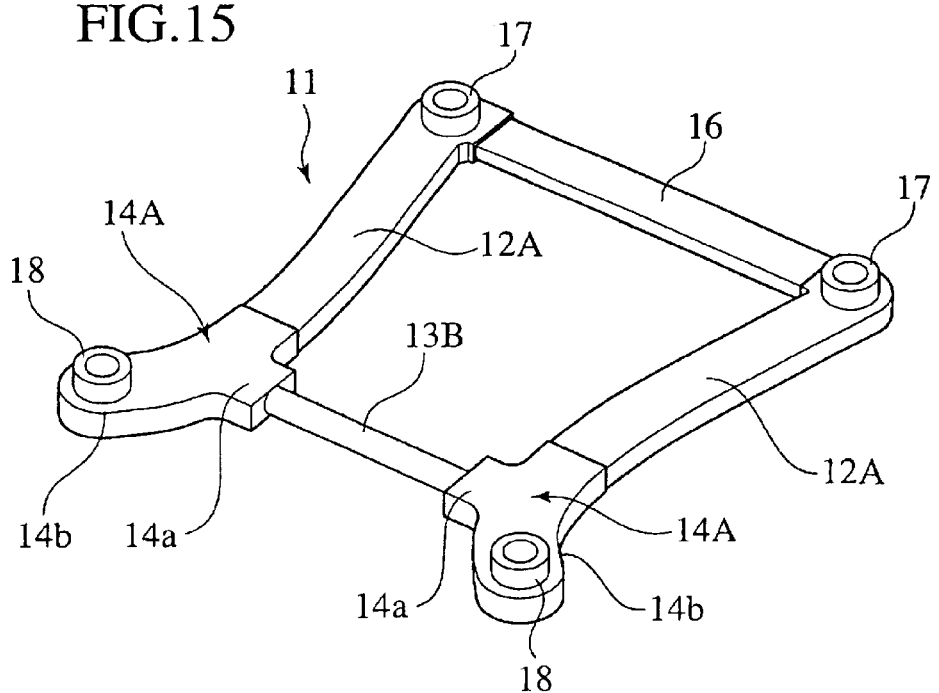
FIG. 15 is a perspective view of the subframe in accordance with the tenth embodiment of the invention.

FIG. 15 shows the tenth embodiment of the invention. Different from the first embodiment, the subframe 11 of the tenth embodiment is provided with a pair of cast forked parts 14A cast in light metals, such as aluminum alloy. Further, both of side frames 12A and a rear frame 13B are formed by different extrusions of the same metals. In assembling, the above forked parts 14A are connected with the rear ends of the side frames 12A respectively. The rear frame 13B is connected, at both ends thereof, with the inside branch parts 14a of the forked parts 14A.

In addition to the effects by the first embodiment, it is possible to accomplish both design and molding of the forked parts 14A with ease. As similar to the ninth embodiment, with the adjustment in length of the rear frame 13B and the front frame 16, it is possible to cope with the requirements of the vehicles having widths between wheels different from each other.

Figure 16:
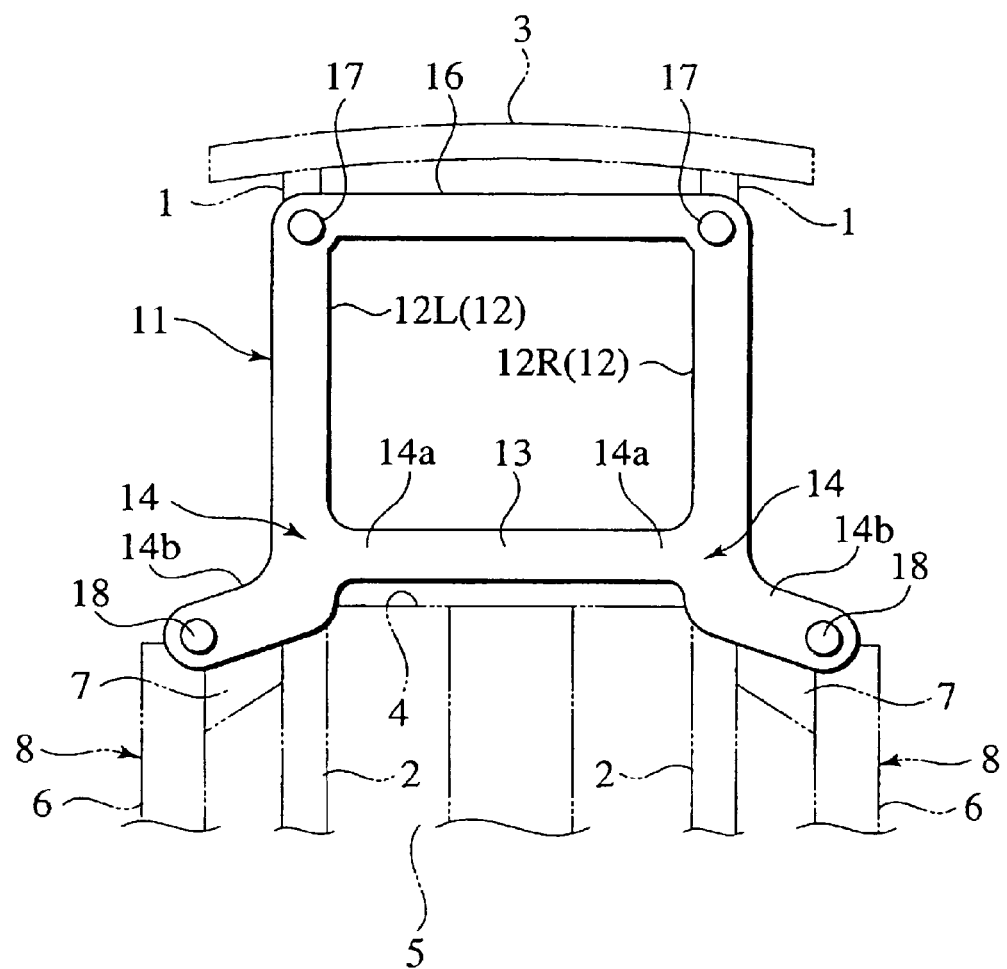
FIG. 16 is an explanatory plan view showing the eleventh embodiment of the invention transparently.

It is noted that the subframe 11 of the first embodiment has the rear-side mount parts 18 joined to the vicinities of the front ends of the extension members 2. In the modification, as shown in FIG. 16, the outside branch parts 14b projecting outward in the width direction of the vehicle are enlarged so that the rear-side mount parts 18 are joined to the environs of the front ends of the side sills 6 (the eleventh embodiment).

In this case, the dispersed load on the rear-side mount part 18 can be transmitted to the side sill 6 having the largest rigidity of the floor framework member 8 directly, allowing the absorbing effect of dispersed load to be enhanced.

Figure 17:
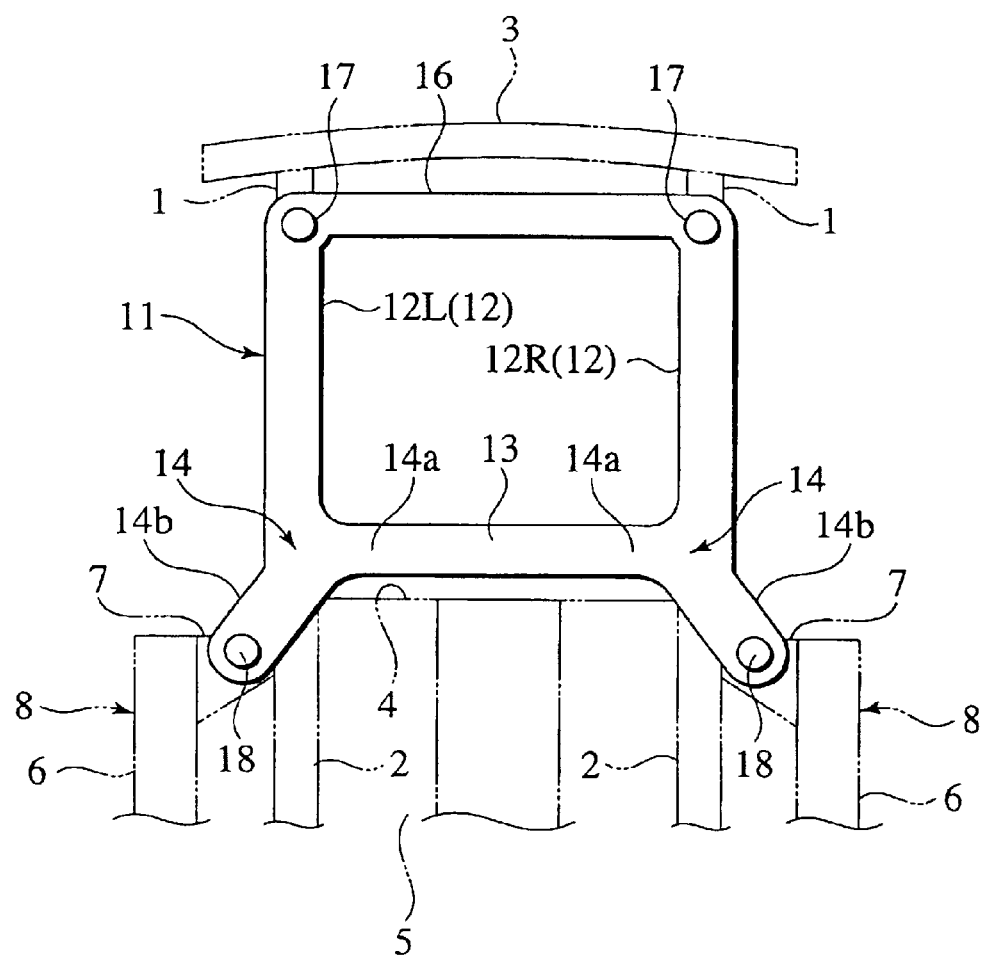
FIG. 17 is an explanatory plan view showing the twelfth embodiment of the invention transparently.

In the twelfth embodiment shown in FIG. 17, the rear-side mount parts 18 are joined to the outriggers 7. With the connecting form, the transmissibility of dispersed load from the rear-side mount parts 18 to the side sills 8 can be improved and furthermore, the plastic deformation of the outriggers 7 allows the collision energy to be absorbed partially.

As mentioned above, according to the present invention, if the offset front collision concentrates its collision input on one side frame of the subframe and the collision input acts on the side frame through its front side in the axial direction, the collision input is dispersed and divided, at the rear side of the side frame, into one load component which points to the inside of the side frame in the width direction along the first route and which is transmitted to the other side frame through the rear frame; and another load component which points to the outside of the side frame in the width direction along the second route and which is transmitted to the floor framework member.

Consequently, without pressing the front of the cabin floor immediately, a load to retreat the subframe can be converted to loads dispersing in the width direction of the vehicle and continuously absorbed in the floor framework member of the cabin effectively, allowing the deformation of the cabin to be restricted.

Finally, it will be understood by those skilled in the art that the foregoing descriptions are nothing but some embodiments of the disclosed front body structure for a vehicle. Besides these embodiments, various changes and modifications may be made to the present invention without departing from the spirit and scope of the invention.

Japanese Patent Application No. 2001-330734 filed on Oct. 29, 2001, is expressly incorporated herein by reference in its entirety.

The scope of the invention is defined with reference to the following claims.

What is claimed is:

1. A front body structure for a vehicle, comprising:
a front-compartment framework member forming a front compartment of the vehicle;
a floor framework member forming a cabin floor of the vehicle;
a subframe arranged on the underside of the front compartment of the vehicle so as to span both of the front-compartment framework member and the floor framework member, the subframe being joined to both of the front-compartment framework member and the floor framework member and also having a pair of left-and-right side frames both extending in a fore-and-aft direction of the vehicle and a rear frame arranged on the rear side of the subframe to connect the left-and-right side frames with each other in a width direction of the vehicle, the subframe further includes a pair of forked parts formed on respective rear sides of the left-and-right side frames, the forked parts each having an inside branch part extending toward the rear frame and an outside branch part projecting from the corresponding inside branch part outward in the width direction of the vehicle; and
a vehicle unit component supported by the subframe, wherein
the subframe is configured so that a collision load, which has been applied on one of the left-and-right side frames in an axial direction, is directed:
along a first route, including the one side frame and the inside branch part of the respective forked part, toward on inside of the one side frame in the width direction of the vehicle to transmit the collision load to the other side frame through the rear frame, and
along a second route, including the one side frame and the outside branch part of the respective forked part, toward an outside of the one side frame in the width direction of the vehicle to transmit the collision load to the floor framework member; and
the floor framework member comprises: a pair of extension side members formed to extend from the respective rear ends of the left-and-right side members to the underface of the cabin floor in the fore-and-aft direction of the vehicle; a pair of side sills arranged on both sides of the cabin floor to extend in the fore-and-aft direction of the vehicle; and a pair of outriggers connecting the front ends of the extension side members with the front ends of the side sills respectively.

2. The front body structure of claim 1, wherein
the front-compartment framework member comprises a pair of left-and-right side members both extending in a fore-and-aft direction of the vehicle;
the subframe further includes a pair of forked parts formed on respective rear sides of the left-and-right side frames respectively, the forked parts each having an inside branch part extending toward the rear frame and an outside branch part projecting from the corresponding side frame outward in the width direction of the vehicle;
the left-and-right side frames are provided, on front ends thereof, with front mount parts respectively;
the outside branch parts of the forked parts are provided with rear mount parts respectively;
respective front ends of the left-and-right side frames are joined to the underfaces of the left-and-right side members respectively through the front mount parts;
the outside branch parts of the forked parts are joined to the underface of the floor framework member through the rear mount parts;
the first route has the inside branch part; and
the second route has the outside branch part.

3. The front body structure of claim 1, wherein the rear mount parts of the subframe are joined to the vicinities of the front ends of the side sills respectively.

4. The front body structure of claim 1, wherein the rear mount parts of the subframe are joined to the vicinities of the outriggers respectively.

5. The front body structure of claim 1, wherein the rear mount parts of the subframe are joined to the vicinities of the front ends of the extension side members respectively.

6. The front body structure of claim 2, wherein each of the left-and-right side frames is shaped to extend from its front end toward the forked part substantially straightly.

7. The front body structure of claim 2, wherein each of the left-and-right side frames is curved toward a vehicle's inside in the width direction of the vehicle.

8. The front body structure of claim 7, wherein each of the left-and-right side frames is provided, on its outer edge of a maximum curved portion thereof in the width direction of the vehicle, with a weakened part which stimulates the side frame to an inward buckling due to the collision load.

9. The front body structure of claim 2, wherein the rear frame of the subframe is shaped to be substantially straight.

10. The front body structure of claim 2, wherein the rear frame is provided, on its front edge of its intermediate portion in the width direction of the vehicle, with a weakened part which stimulates the rear frame to a backward buckling due to the collision load.

11. The front body structure of claim 2, wherein the rear frame is curved upward.

12. The front body structure of claim 2, wherein each of the forked parts of the subframe is shaped so that the inside branch part and the outside branch part diverge from each other in a substantial Y-shaped pattern in plan view.

13. The front body structure of claim 2, wherein each of the forked parts of the subframe has a weakened part formed on the rear side of a boundary between the inside branch part and the outside branch part.

14. The front body structure of claim 2, wherein the left-and-right side frames have their rear ends curved and extended outward in the width direction of the vehicle thereby to form extensions, while the rear frame is connected to both of base parts of the extensions of the left-and-right side frames, whereby each rear extension of the left-and-right side frames constitutes the outside branch, while the base part of the rear frame joined to each of the side frames constitutes the inside branch part, thereby providing the forked part.

15. The front body structure of claim 2, wherein the forked parts are formed independently of the side frames and also connected with respective rear ends thereof and the rear frame is also formed independently of the side frames and connected with the inside branch parts of the forked parts.

16. The front body structure of claim 1, wherein the subframe has a front frame for connecting the front ends of the left-and-right side frames with each other in the width direction of the vehicle.

17. A front body structure for a vehicle, comprising:
a front-compartment framework member forming a front compartment of the vehicle;
a floor framework member forming a cabin floor of the vehicle;
a subframe arranged on the underside of the front compartment of the vehicle so as to span both of the front-compartment framework member and the floor framework member, the subframe being joined to both of the front-compartment framework member and the floor framework member and also having a pair of left-and-right side frames both extending in a fore-and-aft direction of the vehicle and a rear frame arranged on the rear side of the subframe to connect the left-and-right side frames with each other in a width direction of the vehicle;

a vehicle unit component supported by the subframe;

a first route means established on the rear side of the subframe to direct a collision load, which has been applied on one of the left-and-right side frames in an axial direction, toward an inside of the one side frame in a width direction of the vehicle to transmit the collision load to the other side frame through the rear frame; and a second route means established on the rear side of the subframe to direct the collision load toward an outside of the one side frame in the width direction of the vehicle to transmit the collision load to the floor framework member.

* * * * *